N. C. STILES.
Metal Punch.
No. 2,139.
Reissued Dec. 26, 1865.
Fig. 1,
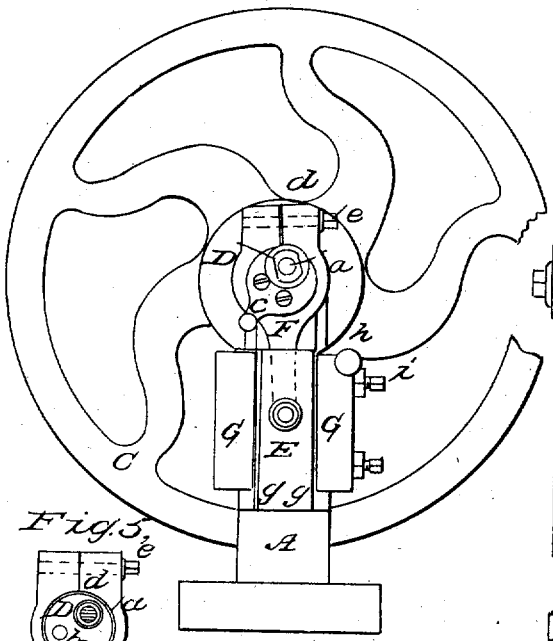
Fig. 2,
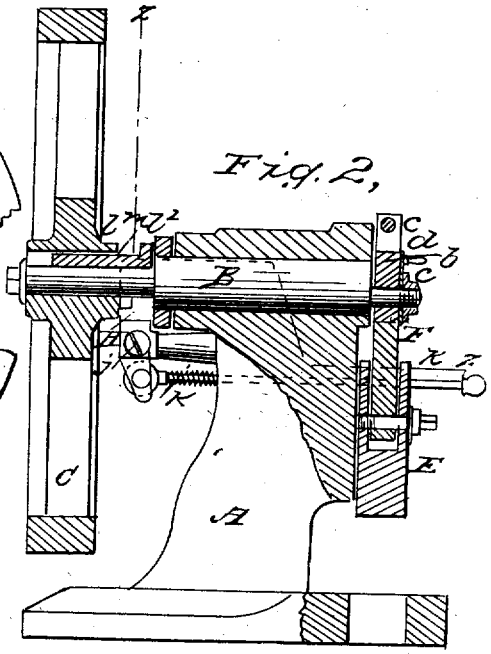
Fig. 5,
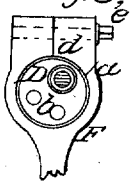
Fig. 3,
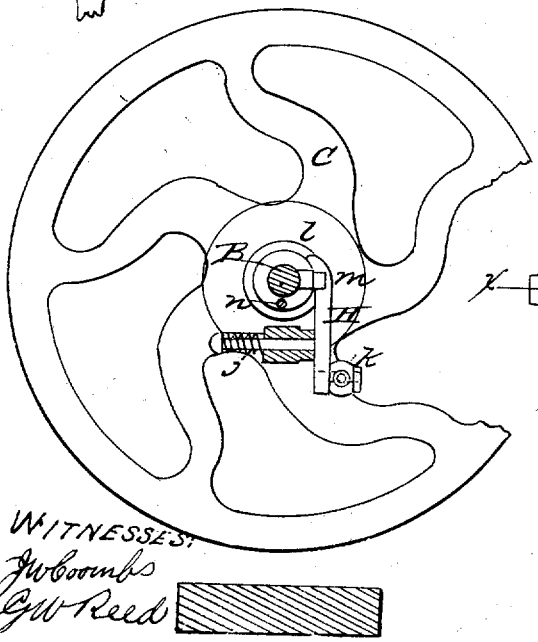
Fig. 4,
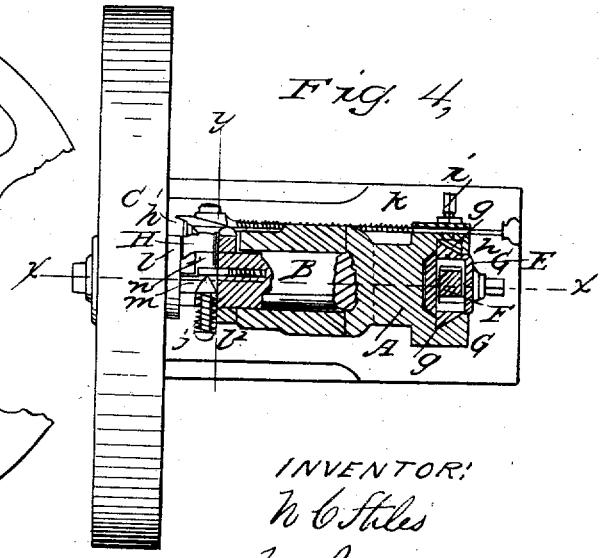
WITNESSES:
J W Coombs
G W Reed
INVENTOR:
N C Stiles
per Munn & Co
attys
N. PETERS, Photo-Lithographer, Washington, D.C.

UNITED STATES PATENT OFFICE.

NORMAN C. STILES, OF MERIDEN, CONNECTICUT.

IMPROVED PUNCHING-PRESS.

Specification forming part of Letters Patent No. 41,403, dated January 26, 1864; Reissue No. 2,139, dated December 26, 1865.

*To all whom it may concern:*

Be it known that I, N. C. STILES, of West Meriden, in the county of New Haven and State of Connecticut, have invented a new and Improved Punching-Press; and I do hereby declare the following, when taken in connection with the accompanying drawings and the letters of reference marked thereon, to be a full, clear, and exact description of the same, and which said drawings constitute part of this specification, and represent, in—

Figure 1, a front elevation of the invention; Fig. 2, a longitudinal vertical section of the same, the line *x x*, Fig. 4, indicating the plane of section; Fig. 3, a transverse vertical section of the same, taken in the plane indicated by the line *y y*, Fig. 4; Fig. 4, a horizontal section of the same, the plane of section being indicated by the line *z z*, Fig. 2; Fig. 5, a detached sectional view of the clamp and eccentric disk for adjusting the position of the punch or cutter.

My invention consists in the arrangement of an adjustable eccentric in relation to and so as to operate the tool holder or slide which carries the punch or cutters, &c., and arranged in such manner that by rotating said eccentric the position of the punch or cutter in relation to the work can be adjusted with the greatest facility and with perfect accuracy.

It consists, further, in the arrangement of a slide with triangular guides operating in two jaws cast solid with the stock of the press and held in place by a triangular gib or gibs in such a manner that all the bearing points or surfaces of the jaws and of the carriage can be planed off by one operation and without changing the position of the piece to be planed on the bed of the planing-machine, and consequently all these surfaces must be perfectly parallel, and, furthermore, the set-screws used to adjust the gib or gibs bear square on a flat surface, so as to allow of setting and retaining said gib or gibs with the greatest accuracy.

It consists, also, in a touch-off motion of peculiar construction, whereby the clutch-pin is moved by the direct action of the cam; further, in the use of a loose clutch-pin, the position of which is entirely controlled by the direct action of the cam, and is not made dependent upon springs or other mechanical devices; also, in the application of a yielding coupling-pin, in combination with the clutch-pin and cam in such a manner that if the clutch-pin is pushed out when it stands opposite to the coupling-pin the latter will yield, and injury to the working parts of the press will be prevented; finally, in attaching the cam-motion to a yielding pin to prevent an accident in turning the press back.

To enable those skilled in the art to fully understand and use my invention, I will proceed to describe it.

Punching-presses are of two kinds. In one the eccentric acts directly upon the slide, as in the well-known "Fowler press," the other by the introduction of a pitman to connect the slide with the eccentric, to either of which my invention is equally applicable.

A represents the stock of my press, which is cast of iron or other suitable material, and the upper part of which forms the bearing for the shaft B. One end of this shaft carries the band-wheel C, which rotates freely on it, and its other end carries the compound eccentric D, through which the motion of the shaft is transmitted to the slide E.

The eccentric D consists of two distinct parts—one the eccentric wrist-pin *a*, and the other the disk *b*, which is perforated with eccentric hole to fit on the wrist-pin *a*. This disk fits nicely into the upper end of the pitman F, and a handle, *c*, is connected with it in such a manner that it can be freely rotated on the wrist-pin *a*. By this operation the pitman F, and consequently the slide E, is raised or lowered, and the position of the punch cutter or tool which is intended to be inserted in the slide can be set to any desired position in relation to the work to be punched or cut. The upper end of the pitman forms a clamp, *d*, and by screwing up the clamp-screw *e* the disk is rendered rigid with the pitman, and the motion of the eccentric wrist-pin *a* is transmitted to the slide E. It is obvious that instead of the clamp-screw *e* other means might be employed to render the disk *b* rigid with the pitman—such, for instance, as a pin passing through a hole in the pitman and catching in corresponding holes in the disk, or a key or wedge inserted between said disk and its bearing, or the clamp-screw might be used in combination with such a pin or key; but in most cases said clamp-screw will be the best and handiest way of screwing the disk in the desired position.

As thus far illustrated, my invention is applied to that class of presses in which the slide is moved by the employment of a pitman. In presses in which the slide is moved without the employment of a pitman the eccentric revolves in a box or slot formed in the slide.

To use my improvement in this class of presses it is only necessary that the box in which the eccentric revolves should be constructed so as to form the clamp in like manner as the pitman F, and the box thus formed and clamped fitted into a groove or slot in the slide in the usual manner for fitting up this class of presses. The slide E moves up and down between two jaws, G, which are cast solid with the stock A, and the faces *g*, which form the bearings of the slide, are triangular. By this shape of the slide and its bearing-faces, and by having the jaws cast solid with the stock of the press, I am enabled to plane the various sliding surfaces on each piece at one operation and without changing its position on the bed of the planing-machine. The slide is put on the bed of the planing-machine with its front side down, and it will be easily understood by practical machinists how all the bearing or working faces can then be planed in one operation, and consequently they will all be perfectly parallel. In the same manner the stock of the press is fastened on the planing-machine with the front side of the jaws G up, and all their working-faces can be planed without changing the position of the work.

For the purpose of setting up the slide and causing it to move steady on its ways, I use a triangular gib, *h*, which is set up by set-screws *i*. This gib offers a square bearing to the set-screws, as will be readily understood by referring to Fig. 4, and the slide can be adjusted with perfect accuracy.

The touch-off motion consists of a cam, H, which is pivoted to a pin, *j*, and connects with a spring-bar, *k*. By pulling the spring-bar the point of the cam is forced up against the inner surface of the hub *l* of the band-wheel C, and as this wheel rotates the clutch-pin *m* comes in contact with the cam H, and by the action of said cam is caused to slide out and to come in contact with the coupling-pin *n*, so as to impart motion to the shaft B. The clutch-pin slides loosely in a recess in the hub of the wheel C, and it is moved in and out entirely by the action of the cam. On pulling the spring-bar *k*. the cam drops behind the spring-catch *k'*, and is retained in that position until the knob or button *l'*, projecting from a collar, $l^2$, which is secured to the shaft B, comes in contact with said catch, and releases the cam.

The coupling-pin *n*, which by action of the clutch-pin *m* transmits the motion of the band-wheel C to the shaft B, is set upon a spring, so that it can yield or recede in case the cam is brought in such a position that the clutch-pin is thrown out at that moment when it stands opposite the coupling-pin. In this case, if the coupling-pin were rigid, some part of the machine would break or its motion would be stopped; but with my yielding coupling-pin no such accident can take place. If the clutch-pin strikes the point of the coupling-pin, the latter recedes, and the motion of the band-wheel continues uninterrupted, causing the clutch-pin to be pushed out, and on the next revolution the motion of the band-wheel is transmitted to the shaft B. The fulcrum-pin *j* of the cam H is also rendered yielding, so that in turning the machine back, when the clutch-pin happens to be out, the cam is allowed to give way and to let the clutch-pin pass without causing an accident. If desired, however, the clutch-pin and also the cam might be made with two points, so that said cam would be enabled to govern the position of the clutch-pin in either direction, and in this case the yielding fulcrum could be dispensed with.

By this invention a punching-press is produced which allows of adjusting the position of the punch or cutter in relation to the work with ease and facility, which is provided with a slide and ways, the working-faces of which are perfectly parallel, and which can be adjusted to work with perfect accuracy. Furthermore, the motion of the press and of the punch can be regulated and governed at pleasure, and all the parts are so constructed that no accident can happen, however careless the operator having charge of the press.

What I claim as new, and desire to secure by Letters Patent, is—

1. The compound eccentric D, consisting of an eccentric wrist-pin, *a*, adjustable disk *b*, and clamp *d*, or its equivalent, constructed and operating in the manner and for the purpose substantially as set forth.

2. The V-shaped faces *g* on the slide E, in combination with the jaws G, cast solid with the stock A and with the triangular gib *h*, all as and for the purpose specified.

3. The touch-off device *k* H, arranged in combination with the clutch-pin *m*, substantially as shown and described, so that said clutch-pin is thrown in either direction by the direct action of the cam.

4. The loose clutch-pin *m*, applied in combination with the band-wheel C and shaft B, in the manner and for the purpose substantially as specified.

5. The button *l* on the shaft B, in combination with the spring-catch *k'*, clutch-pins *m* and *n*, and cam H, arranged substantially as described, so that the cam is released automatically after the punch or cutter has completed its stroke.

6. The yielding coupling-pin *n*, in combination with the clutch-pin *m* and touch-off device *k* H, constructed and operating in the manner and for the purpose substantially as specified.

7. The yielding fulcrum-pin *j*, arranged in combination with the cam H, clutch pin *m*, and band-wheel C, substantially as and for the purpose set forth.

NORMAN C. STILES.

Witnesses:
HENRY M. FOSTER,
ORVILLE H. PLATT.